Aug. 12, 1924.  1,504,270
W. D. ROOT
FEEDING DEVICE FOR POP CORN MACHINES
Filed Oct. 25, 1920
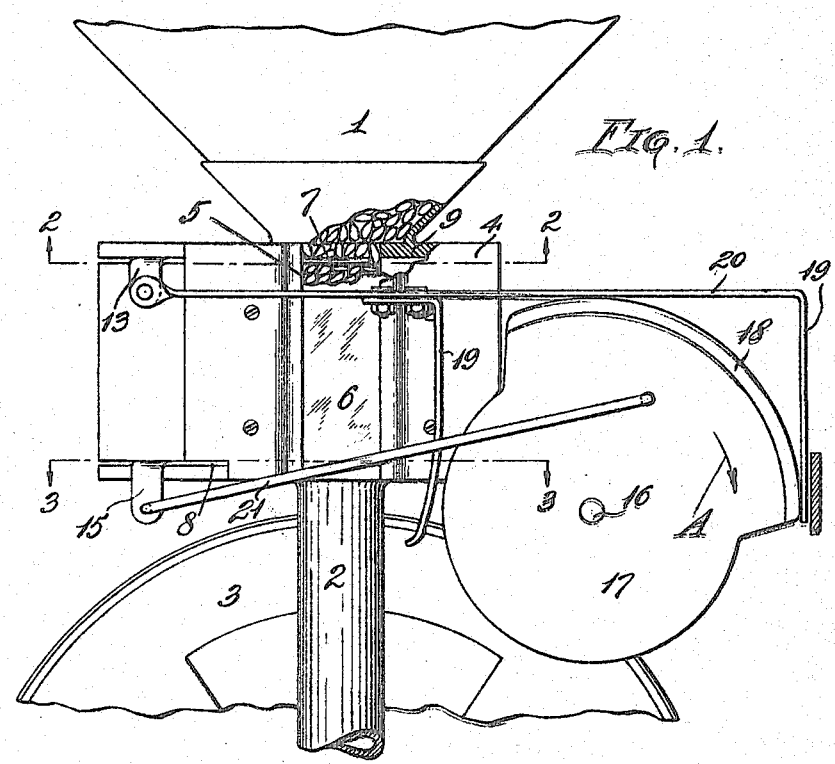
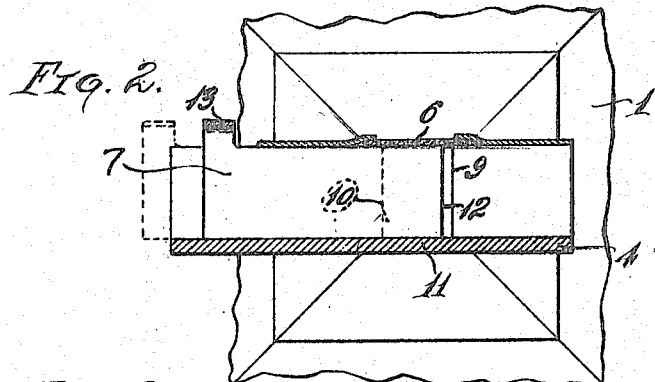
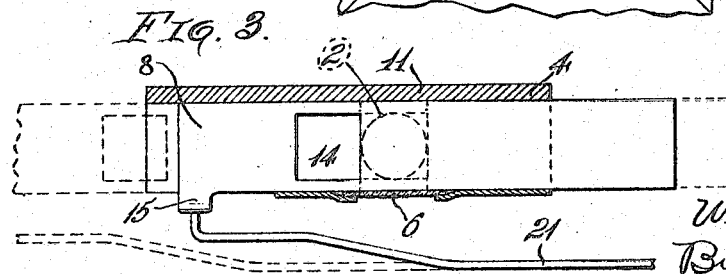
Inventor.
William D. Root
By Brockett & Hyde
Attys.

Patented Aug. 12, 1924.

1,504,270

UNITED STATES PATENT OFFICE.

WILLIAM D. ROOT, OF LAKEWOOD, OHIO, ASSIGNOR, BY MESNE ASSIGNMENTS, TO THE GUARDIAN SAVINGS AND TRUST COMPANY, TRUSTEE, OF CLEVELAND, OHIO.

FEEDING DEVICE FOR POP-CORN MACHINES.

Application filed October 25, 1920. Serial No. 419,556.

*To all whom it may concern:*

Be it known that I, WILLIAM D. ROOT, a citizen of the United States, residing at Lakewood, in the county of Cuyahoga and State of Ohio, have invented certain new and useful Improvements in Feeding Devices for Pop-Corn Machines, of which the following is a specification.

This invention relates to pop corn feeding devices and has for its object to provide an improved device of this kind which is of simple form, which may be easily constructed and operated, which accurately measures each charge of corn, which does not crush or injure the corn kernels, and the operation of which is not interfered with by the corn.

Further objects of the invention are in part obvious and in part will appear more in detail hereinafter.

In the drawings, which represent one embodiment of the invention, Fig. 1 is a front elevation, partly broken out and in section; Fig. 2 is a plan view on the line 2—2, Fig. 1 looking in the direction of the arrows; and Fig. 3 is a similar view on the line 3—3, Fig. 1.

1 represents a hopper or reservoir for the raw pop corn or other material to be fed and which is to be delivered to the chute or pipe 2 from which it will flow, for example, to the popping drum or chamber 3. 4 represents the frame of the measuring device which is provided with a measuring chamber or cavity 5 preferably closed at its front by a window 6 through which the measuring or feeding operation may be observed. This chamber communicates at its upper end with the reservoir 1 and at its lower end with the chute 2. The flow of material to and from said chamber is controlled by upper and lower gates or valve members marked 7 and 8 respectively.

The chamber 5 in plan view is of rectangular shape, as shown in Fig. 2, its end walls 9, 10 and side wall 11 being formed by the body of the casing and its other side wall by the window 6.

Both of the gate members 7, 8 are flat sheet metal members slidable horizontally in slots in the casing. The upper member 7 is imperforate and has a straight edge 12 at one end and a laterally extending depending ear 13 at the other end. The lower gate 8 is of greater length and has an opening 14 between its ends and an ear 15 at one end.

The operating mechanism for said gates may be of any desired form. As shown both gates are operated from a common rotatable shaft 16 which is provided with a cam wheel 17 having a portion of its periphery cut away to leave a raised portion 18. This cam rotates between two arms 19 depending from a rod or bar 20 pivoted to the ear 13. The lower slide is operated by a connecting rod 21 pivoted to the ear 15 and having its opopsite end connected to the cam wheel 17. As said cam wheel rotates both gates are reciprocated, as will be obvious.

In the operation of devices of this kind for measuring charges of corn or similar small grains or kernels the lower gate or valve is moved across the opening or bottom of the measuring chamber so that a blank portion thereof forms a seat to receive and stop the mass of descending corn. When the measuring chamber has been filled the upper gate or valve is then moved across the opening at the top of the measuring chamber to cut off the measured charge in the measuring chamber from the mass of material in the reservoir, after which the lower gate or valve is again moved to open the discharge opening and allow the measured charge to flow from the measuring chamber.

The chief difficulty with these feeding devices is one encountered in the operation of the upper gate or valve which, when moved across the upper opening to cut off the charge, usually acts as a shear during the final stage of its movement to cut or crush one or more kernels between its end edge and the side wall of the chute or casing, not only injuring the corn but also unnecessarily resisting movement of the slide and possibly injuring its operating mechanism.

In the present device the parts are so arranged that the opening at the upper end of the measuring chamber is never wholly closed. In other words, the upper gate or valve is reciprocated between the two positions shown in full and dotted lines, Fig. 2. In the dotted line position the opening is fully opened, and in the full line position the end edge 12 of the gate or valve has approached fairly close to but has not actually reached the end wall 9 of the passage. Consequently, as shown in Fig. 1, any kernels of corn which lie in a position opposite the end of the slide merely lie there without being crushed, and when the lower gate or valve is opened the charge of corn falls from the measuring chamber and possibly one or a few additional kernels may trickle through the small slot or opening, but without materially affecting the accuracy of the measurement of the charge.

The lower gate or slide reciprocates between the two end positions, in one of which its opening 14 fully registers with the chute 2 and the opening at the bottom of the measuring chamber, and in the other of which its opening 14 is retracted to the position shown at the left in dotted lines, Fig. 3. When this opening is retracted the bottom of the chamber is held closed by the blank or imperforate extension of said slide beyond its opening.

Fig. 1 illustrates the position of the parts when the cam 18 has just moved the upper slide to closed position. Wheel 17 rotates in the direction of the arrow A. Its continued rotation moves the lower slide to open the bottom of the measuring chamber to allow the charge to drop out, after which the lower slide is retracted to again close the bottom of the measuring chamber. Subsequently the cam 18 engages the left hand arm 19, Fig. 1, and retracts the upper gate 7 so as to again fill the measuring chamber.

What I claim is:

1. Apparatus for feeding measured charges of popcorn or similar small grains or kernels, comprising a reservoir having an opening through which the material is fed, a gate slidable across said opening to control the flow of material therethrough, an actuating member connected to said gate, said member having spaced arms, a cam mounted between said arms and engageable therewith to shift said gate, said actuating member and cam being so arranged that said gate is moved from a full open position to a position in which the opening is practically but not entirely cut off.

2. Apparatus for feeding measured charges of popcorn or similar small grains or kernels, a reservoir having a discharge passage, oppositely moving spaced upper and lower gates slidable across the passage and adapted to deliver measured charges from the hopper, a rotatable actuating cam, a connecting rod from the cam to one of said gates, and an actuating member having spaced arms engaging the periphery of the cam and connected to the other gate, said upper gate being movable by said cam from open position to a position in which the passage is practically but not entirely cut off.

In testimony whereof I hereby affix my signature.

WILLIAM D. ROOT.